(12) United States Patent
Kim

(10) Patent No.: US 8,938,120 B2
(45) Date of Patent: Jan. 20, 2015

(54) IMAGE SENSING DEVICE AND IMAGE DATA PROCESSING METHOD USING THE SAME

(71) Applicant: SK Hynix Inc., Icheon-si Gyeonggi-do (KR)

(72) Inventor: Jong Park Kim, Gunpo-si (KR)

(73) Assignee: SK Hynix Inc., Gyeonggi-do (KR)

(*) Notice: Subject to any disclaimer, the term of this patent is extended or adjusted under 35 U.S.C. 154(b) by 320 days.

(21) Appl. No.: 13/624,314

(22) Filed: Sep. 21, 2012

(65) Prior Publication Data

US 2013/0077861 A1    Mar. 28, 2013

(30) Foreign Application Priority Data

Sep. 23, 2011  (KR) .................. 10-2011-0096040

(51) Int. Cl.
G06K 9/00  (2006.01)
G06T 3/40  (2006.01)
H04N 9/04  (2006.01)

(52) U.S. Cl.
CPC .............. G06T 3/4015 (2013.01); H04N 9/045 (2013.01)
USPC ........................................... 382/167

(58) Field of Classification Search
USPC ......... 382/162, 165, 167, 199, 266, 274, 275, 382/300; 348/222.1, 229.1
See application file for complete search history.

(56) References Cited

U.S. PATENT DOCUMENTS 7,248,288 B2 *   7/2007  Ikeda et al. ................ 348/222.1
8,035,705 B2 *  10/2011  Tsuruoka .................... 348/252
2007/0165116 A1 *  7/2007  Hung et al. ................ 348/241

FOREIGN PATENT DOCUMENTS

KR    1020090000517 A    1/2009
KR    1020110079317 A    7/2011

* cited by examiner

*Primary Examiner* — Phuoc Tran
(74) *Attorney, Agent, or Firm* — William Park & Associates Patent Ltd.

(57) ABSTRACT

An image data processing method includes generating a data window comprising N rows and N columns using Bayer data from a pixel array, generating a red (R), green (G), blue (B) data of a center pixel in the data window, detecting an edge region in the data window, detecting a bright region in the data window, adjusting the R, G, B data using a suppressing gain factor if both of the edge region and bright region is detected, and outputting the adjusting R, G, B data as a result of an interpolating process.

20 Claims, 5 Drawing Sheets

FIG. 4(a)

| Gr | R  | Gr | R  | Gr |
|----|----|----|----|----|
| B  | Gb | B  | Gb | B  |
| Gr | R  | Gr | R  | Gr |
| B  | Gb | B  | Gb | B  |
| Gr | R  | Gr | R  | Gr |

FIG. 4(b)

| Gb | B  | Gb | B  | Gb |
|----|----|----|----|----|
| R  | Gr | R  | Gr | R  |
| Gb | B  | Gb | B  | Gb |
| R  | Gr | R  | Gr | R  |
| Gb | B  | Gr | B  | Gb |

IMAGE SENSING DEVICE AND IMAGE DATA PROCESSING METHOD USING THE SAME

CROSS-REFERENCE(S) TO RELATED APPLICATIONS

The present application claims priority under 35 U.S.C. 119(a) to Korean Patent Application No. 10-2011-0096040, filed on Sep. 23, 2011, in the Korean Intellectual Property Office, which is incorporated herein by reference in its entirety.

BACKGROUND OF THE INVENTION

1. Field of Invention

Example embodiments of the present invention relate to an image sensing device and an image data processing method using the same.

2. Description of Related Art

An image sensor refers to a semiconductor device which converts an optical signal into an electric signal. The image sensor is categorized into a charge coupled device (CCD) image sensor and a complementary metal oxide semiconductor (CMOS) image sensor. The CCD image sensor typically comprises individual MOS capacitors that are disposed very close to each other where charge carriers are stored in the MOS capacitors. As for the CMOS image sensor, a pixel array including MOS transistors and photodiodes, a control circuit, and a signal processing circuit are integrated into a single chip.

The CCD image sensor has disadvantages in that a driving scheme is complicated, a large amount of power is dissipated, and a fabricating process is complicated because a large number of mask process steps are required. It is also difficult to achieve a one-chip implementation because a signal processing circuit cannot be integrated into a CCD chip. However, the CMOS image sensor reproduces an image by forming a photodiode and MOS transistors within a unit pixel and sequentially detecting signals using a switching scheme. The CMOS image sensor has advantages in that power dissipation is reduced and fabrication typically requires the use of fewer masks as compared to the CCD fabrication process, thereby improving fabrication efficiency. In addition, a one-chip implementation can be achieved since several signal processing circuits and pixel arrays can be integrated into a single chip. Hence, the CMOS image sensor is considered as a next-generation image sensor.

In general, an image sensor includes a pixel array, which receives external incident light and converts photoelectric charges into electric signals, and micro lenses which are arranged in pixels on the pixel array. In addition, the image sensor includes a logic circuit which processes light sensed through the pixel array into electric signals and converts the electric signals into data.

Typically the pixel array is configured with a Bayer pattern which is most widely used. The Bayer pattern typically comprises an arrangement of 50% green pixels, 25% red pixels, and 25% blue pixels. The red pixels and the green pixels are alternately disposed in a single line, and the blue pixels and the green pixels are alternately disposed in a next line. Thus, one pixel carries information about only one color, for example red, blue or green. Since every pixel datum typically has to information about three colors to implement an image, information about the two colors not provided by a target pixel has to be extracted from pixels neighboring the target pixel. This process is generally called interpolation.

Since the information about the two neighboring colors extracted by the values arrived at by the interpolation process is not the real image data, an implemented image has some difference with a real image. For instance, if an interpolation process regarding a boundary between a dark region and a bright region in an image is implemented, interpolated data adjacent the boundary may contain error the interpolation process may arrive at very different information from the real information that is associate with the view of the boundary area. If an interpolation process with a green data in a bright region and another green data in a dark region is implemented to extract green data for a blue pixel or a red pixel, the extracted green data may have wrong information. Since correct information regarding brightness is very important to make a good quality image, the above problem can be serious.

SUMMARY OF THE INVENTION

An embodiment of the present invention is directed to an image sensor which can reliably process Bayer pattern image data, and an image data processing method using the same.

In accordance with an embodiment of the present invention, an image data processing method includes generating a data window comprising N rows and N columns using a Bayer data from a pixel array, generating a red (R), green (G), blue (B) data of a center pixel in the data window, detecting an edge region in the data window, detecting a bright region in the data window, adjusting the R, G, B data using a suppressing gain factor if both of the edge region and bright region is detected, and outputting the adjusting R, G, B data as a result of an interpolating process.

In accordance with another embodiment of the present invention, An image sensing device includes a RGB data generating unit extracting a R, G, B data for a center pixel from a data window N rows and N columns arranged as a Bayer pattern, an edge detecting unit detecting an edge region of the data window, a bright region detecting unit detecting a bright region of the data window, an error color reducing unit adjusting the R, G, B data using the edge region and the bright region, and an outputting unit outputting the extracted R, G, B data for the RGB data generating unit or the adjusted R, G, B data from the error color reducing unit.

In accordance with still another embodiment, an image sensing device is configured to detect an edge region and a bright region in a data window in a Bayer data format comprising a pixel array, and adjusting a red (R), green (G) and blue data associated with pixels comprising the pixel array where the adjusting is done using a suppressing gain factor if both an edge region and a bright region is detected within the data window.

BRIEF DESCRIPTION OF THE DRAWINGS

FIG. 4(*a*) and FIG. 4(*b*) illustrate the data window of FIG. 3 according to characteristics of pixels;

DESCRIPTION OF SPECIFIC EMBODIMENTS

Figure 1:
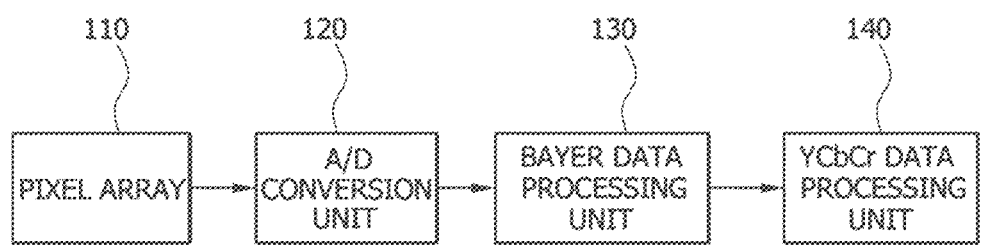
FIG. 1 is a block diagram illustrating an image sensor, which is presented for explaining the present invention.

Example embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough, and convey a scope of the present invention to those skilled in the art. Throughout the disclosure, like reference numerals refer to like parts throughout the various figures and embodiments.

FIG. 1 is a block diagram illustrating an image sensor, which is presented for purposes of explanation. The block diagram of FIG. 1 is illustrated based on functions of the image sensor. The block diagram of FIG. 1 may be modified in some cases to include additional blocks.

Referring to FIG. 1, the image sensor includes a pixel array 110, an A/D conversion unit 120, a Bayer data processing unit 130, and a YCbCr data processing unit 140.

The pixel array 110 includes a plurality of pixels arranged in a Bayer pattern. Specifically, pixel array 110 may comprise 50% green pixels, 25% red pixels, and 25% blue pixels. The A/D conversion unit 120 converts an analog image data value provided from the pixel array 110 into a digital value. Since the pixel array 110 provides the image data value in a Bayer pattern, the digital data provided from the A/D conversion unit 120 is also outputted in a Bayer pattern. That is, a single pixel value contains only green information, red information, or blue information. In addition, although not illustrated, a pixel read-out circuit is provided between the pixel array 110 and the A/D conversion unit 120.

In the image data processing, the Bayer data processing unit 130 expresses a period in which the Bayer pattern format is maintained. The YCbCr data processing unit 140 converts red (R) green (G) blue (B), i.e. RGB data, provided from the Bayer data processing unit 130 into YCbCr data. YCbCr is an imaging format used in an image system. Y is a brightness component, and Cb and Cr are chrominance components.

Although it has been described above that the image sensor illustrated in FIG. 1 uses the Bayer pattern, embodiments may be realized using patterns other than the Bayer pattern. Even when other patterns are used, embodiments of the invention can operate with the different values that are outputted from the same color pixels, regardless of the pattern arrangement of the pixel array.

Figure 2:
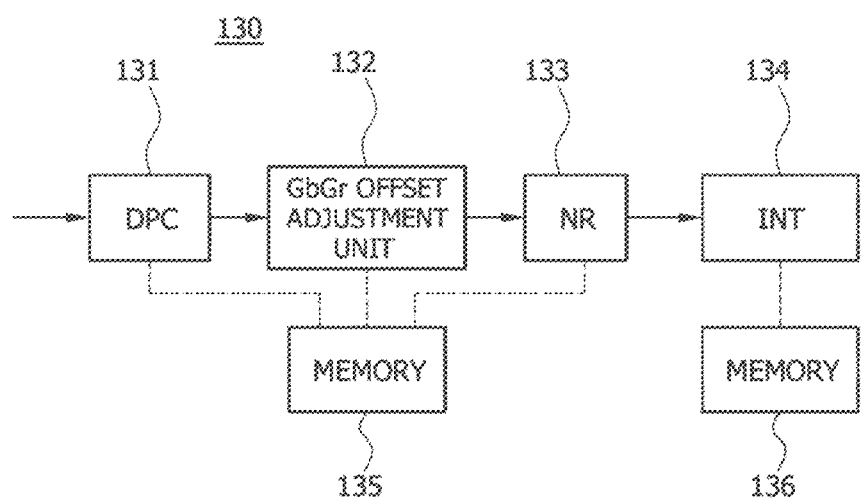
FIG. 2 is a block diagram illustrating a Bayer data processing unit of FIG. 1.

FIG. 2 is a block diagram illustrating the Bayer data processing unit of FIG. 1.

Referring to FIG. 2, the Bayer pattern processing unit 130 includes a dead pixel concealment (DPC) unit 131, a GbGr offset adjustment unit 132, a noise reduction (NR) unit 133, and an interpolation unit 134. In addition, the Bayer data processing unit 130 further includes a memory unit 135 used when the DPC unit 131, the GbGr offset adjustment unit 132, and the NR unit 133 process data, and a memory unit 136 used when the interpolation unit 134 processes data.

The DPC unit 131 checks whether a center pixel is a dead pixel, and if so, data for the detected dead pixel is replaced with an adjacent normal pixel data. A dead pixel is a pixel that outputs a constant value regardless of whether incident light is on it. The center pixel will be described later. The GbGr offset adjustment unit 132 is a block which adjusts an offset occurring when a green pixel Gb whose adjacent pixel is a blue pixel and a green pixel Gr whose adjacent pixel is a red pixel in the Bayer pattern receive an equal amount of light but the green pixels Gb and Gr output different values. The NR unit 133 is a block which processes pixel data in order to reduce noise in the pixels that are processed. The interpolation unit 134 is a block which creates RGB data which generates red, green, and blue data values corresponding to each pixel in the Bayer data containing only one of red information, green information, and blue information. The interpolation unit 134 generates a data value of a selected center pixel using the information of pixels adjacent to the selected center pixel.

Figure 3:
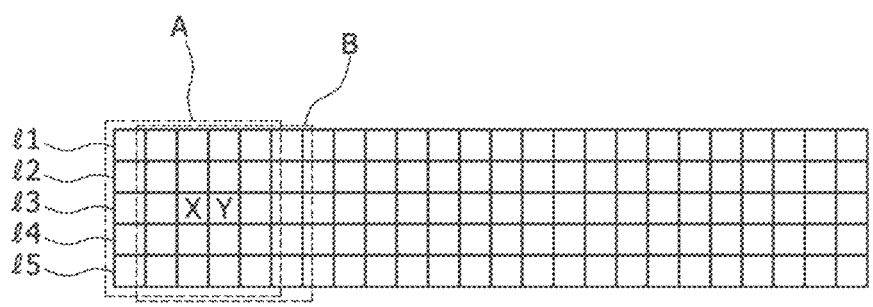
FIG. 3 illustrates a data window generated by a memory of FIG. 2.

FIG. 3 illustrates data windows generated during processing described in relation to FIG. 2. FIG. 4(a) and FIG. 4(b) illustrate the data window of FIG. 3 displayed according to characteristics of pixels. A procedure of configuring a data window will be described below with reference to FIGS. 3, 4(a), and 4(b).

The image sensor is configured so that all information provided from a full pixel array is not processed at one time, and each unit receives and processes only data of a predetermined region and transfers the processed data to a next unit, in order to efficiently use memory in each step.

As illustrated in FIG. 3, when it is assumed that the memory unit 135 can store data of five lines L1 to L5 from the pixel array shown in FIG. 3, a first 5×5 data array (that is, 5 by 5 a data array comprising five rows and five columns) is arranged as a data window A as illustrated in FIG. 4(a). A pixel located at the center is defined as a center pixel X, and each block performs a necessary data processing on the center pixel X. The data processing refers to an interpolation or a process of detecting an edge direction with respect to data around the center pixel X. After the data processing is performed on the center pixel X, the data window is moved to a data window "B" and data are arranged as illustrated in FIG. 4(b). At this time, a pixel located at a position "Y" becomes a center pixel. By sequentially changing the data window, all data of the pixel array are sequentially processed. Two lines located at the edges of the pixel array may be used as auxiliary data.

Although, as described above, the data window processed by the image sensor is 5×5, the data window may be any number of various sizes, such as, for example, 3×3 or 7×7, or n×n where n×n denotes a window of any size having a same number of rows and columns which includes a center pixel.

The interpolation unit 134 generates R, G, B data of a center pixel referring to data of pixels neighboring or around the center pixel. If an image sensing device uses a Bayer pattern, the interpolating process is used to render an image. The quality of a final generated image depends on how the interpolating process is implemented. A data window such as 3×3 or 5×5 is generated in a memory unit, and R, G, B data for a center pixel in the data window is generated. In the case of a green center pixel, red data is generated when there is an average value of red pixels neighboring the center pixel, and blue data is also generated when there is an average value of blue pixels neighboring the center pixel.

However, as described above, error color data may be generated at a boundary between a bright region and a dark region during an interpolation process of the center pixel. The error color data is a different data from a real or actual view.

When viewing branches of a tree on a sunny day, the branches are dark but spaces adjacent to the branches are bright. If the interpolating process regarding boundary between the branches is implemented, an average between brightness data and darkness data is generated for pixels in the boundary region which means error color data may be generated. That is, an image data different from the real view is provided. Generally, data in a brightness region has values that are too high compared with a dark region.

If pixel data in the boundary region has error color information, another color correction process may be included in an image data process. For example, data including error color information would be removed or reduced with a noise filter. Processing time for generating an image data has to be raised and more circuits may be also needed if a color correction is performed with, for example, an image filter.

In accordance with an embodiment of the present invention, an image sensing device can reduce error color information that may be generated at boundary of a bright region and a dark region during a middle of an interpolating process.

Figure 5:
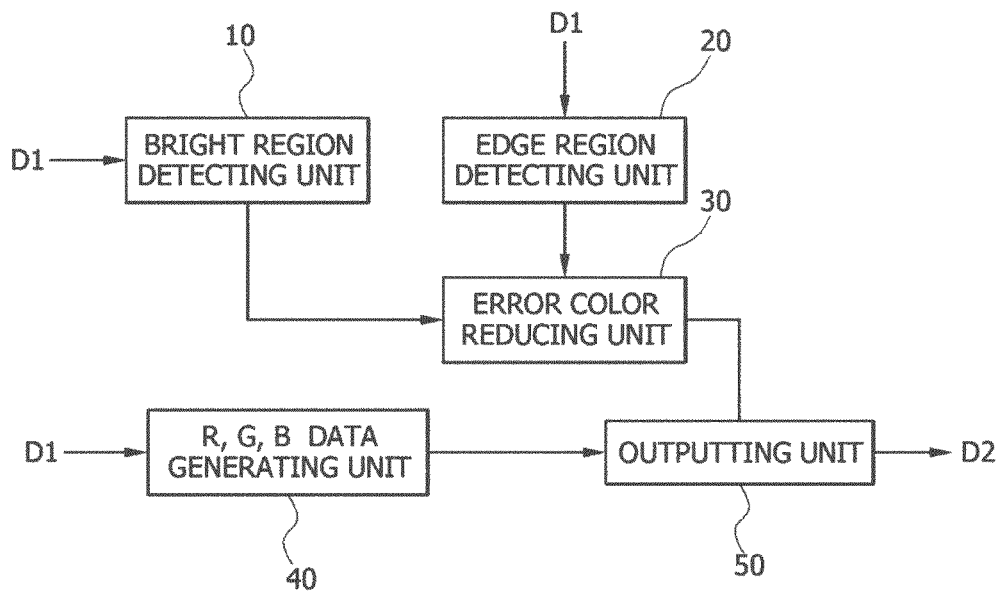
FIG. 5 is a block diagram illustrating an image sensing device in accordance with an embodiment of the present invention.
Figure 6:
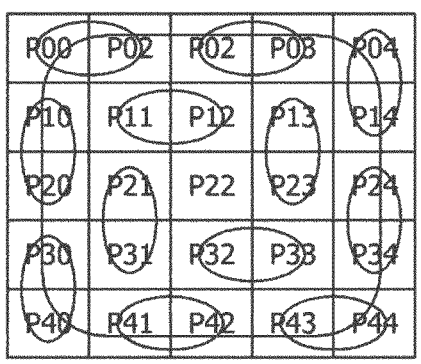
FIG. 6 illustrates a data window of an image sensing device in accordance with an embodiment of the present invention.

FIG. 5 is a block diagram illustrating an image sensing device in accordance with an embodiment of the present invention and especially shows the interpolation unit 134. FIG. 6 illustrates a data window of an image sensing device in accordance with an embodiment of the present invention.

As shown in FIG. 5, the interpolation unit 134 in accordance with an embodiment of the present invention includes a bright region detecting unit 10, an edge region detecting unit 20, an error color reducing unit 30, a R, G, B data generating unit 40, and an outputting unit 50.

An image sensing device in accordance with an embodiment of the present invention detects a boundary area that is a border between a bright region and a dark region using a Bayer patterning data D1 for an interpolating process and uses algorithms to suppress error color information generated from the boundary area and then, can make a good quality of image.

The bright region detecting unit 10 detects whether a bright region is arranged around a center pixel after the bright region detecting unit 10 constitutes a 5×5 data window or other n×n data window. Herein, around or surrounding the center pixel refers to pixels other than the center pixel of an n×n window. The edge region detecting unit 20 detects whether an edge region is arranged around the center pixel. The error color reducing unit 30 uses algorithms for suppressing error color information to generate R, G, B data of which error color values are reduced if the data window comprises both of a bright region and an edge region. The R, G, B data generating unit 40 generates a R, G, B data with the Bayer patterning data D1. The outputting unit 50 selects output data from the error color reducing unit 30 or output data generated from the R, G, B data generating unit 40. If the error color reducing unit 30 uses the algorithm for suppressing error color information, the outputting unit 50 outputs an output data D2 from the error color reducing unit 30.

Generally, the brightness of green color data decides a brightness level in an image sensing device. However, just green color data cannot guarantee the brightness level. Red data, blue data and green data are needed to determine a correct brightness level in an image. The characteristics of data in bright region is that a ratio of a red data, blue data and a green data which may almost be 1:1:1 where that color indicates an achromatic color.

The bright region detecting unit 10 calculates a data average regarding two contiguous pixels (i.e., continuous and/or adjacent pixels that may be associated and/or bound) including at least one green pixel where the two contiguous pixels are around a center pixel and then, determines whether the center pixel is arranged in a bright region if the data average is more than a white threshold value. In the following formula 1, there is the method for determining whether a bright region is arranged. The following formula 1 is completed referring to the data window in FIG. 6. For instance, the value W1 is average of pixels P00 and P01. If the value W1 is higher than the white threshold value, pixels P00 and P01 are determined as a bright region. If one of W1, W2, W3, . . . , and W12 is at least higher than the white threshold value, the region around the center pixel P22 is determined as a bright region.

$W1=(P00+P01)/2>\text{White threshold}$ $W2=(P02+P03)/2>\text{White threshold}$ $W3=(P04+P14)/2>\text{White threshold}$ $W4=(P24+P34)/2>\text{White threshold}$ $W5=(P43+P44)/2>\text{White threshold}$ $W6=(P41+P42)/2>\text{White threshold}$ $W7=(P30+P40)/2>\text{White threshold}$ $W8=(P10+P20)/2>\text{White threshold}$ $W9=(P11+P12)/2>\text{White threshold}$ $W10=(P13+P23)/2>\text{White threshold}$ $W11=(P32+P33)/2>\text{White threshold}$ $W12=(P21+P31)/2>\text{White threshold}$ [formula 1]

Herein, two contiguous pixels illustrated in FIG. 6 are for example selected and an average of the two pixels is calculated. A different pattern from that of FIG. 6 may also be used. For example, pixel P13 and pixel P14 can be bound or pixel P13 and pixel P03 can be bound. That is, two contiguous pixels can be bound in any direction. For example, contiguous pixels that are on top of each other may be bound, contiguous pixels that are horizontally next to each other may be bound, contiguous pixels that are diagonal to each other may be bound, etc. In short, pixels that are adjacent to each other in any way may be bound.

The edge region detecting unit 20 detects whether an edge region is arranged in any direction for instance, a horizontal direction, a perpendicular direction, or a diagonal direction after checking a subtractive value of two contiguous pixels around the center pixel. The edge region detecting unit 20 extracts the highest value of the subtractive value of all the pairs of two contiguous pixels surrounding the center pixel. If the extracted subtractive value is higher than a predetermined threshold value, the edge region detecting unit 20 determines that there is an edge region around the center pixel, and the edge direction is toward the two contiguous pixels. If an edge region is detected, an algorithm for suppressing error color information is executed.

The error color reducing unit 30 adjusts R, G, B data of the center pixel using information from the edge region detecting unit 20 and the bright region detecting unit 10. If the edge region detecting unit 20 detects an edge region around the center pixel and the bright region detecting unit 10 detects a bright region around the center pixel, the error color reducing unit 30 adjusts R, G, B data with predetermined values. In one example, this is called the algorithm for suppressing error color information.

The description of error color suppression in accordance with an embodiment of the invention follows. Assuming that a data window is 5×5, a center pixel is a green pixel and a bright region in the data window is detected, color data of the center pixel is adjusted.

A first difference Diff_gr between green color data and red color data of the center data, and a second difference Diff_gb between green color data and blue color data of the center data is calculated with the following formula 2.

Diff_gr=|Green−Red|, Diff_gb=|Green−Blue|   [formula 2]

Using the following formula 3 and the first and second differences, new red color data and new blue color data is calculated. The suppressing gain factor Gain_sup is determined according to the first and second differences. As the first and second differences increases, the suppressing gain factor Gain_sup increases. The suppressing gain factor Gain_sup may have one value or two values depending on the magnitude of the blue color and red color.

New Red=Green±(Diff_gr*Gain_sup)

New Blue=Green±(Diff_gb*Gain_sup)   [formula 3]

The new/adjusted red value and new/adjusted blue value is used instead of an interpolated R and B value of the center pixel P22. The green data, the new red value and the new blue value is used for constructing an image. Finally, an image without error color information is realized. In other words, error color information comes to a sort of achromatic color information. Pixel data having achromatic color information means that the pixel is not prominent in the final image and ensures an image closer to an actual/real image is realized.

Figure 7:
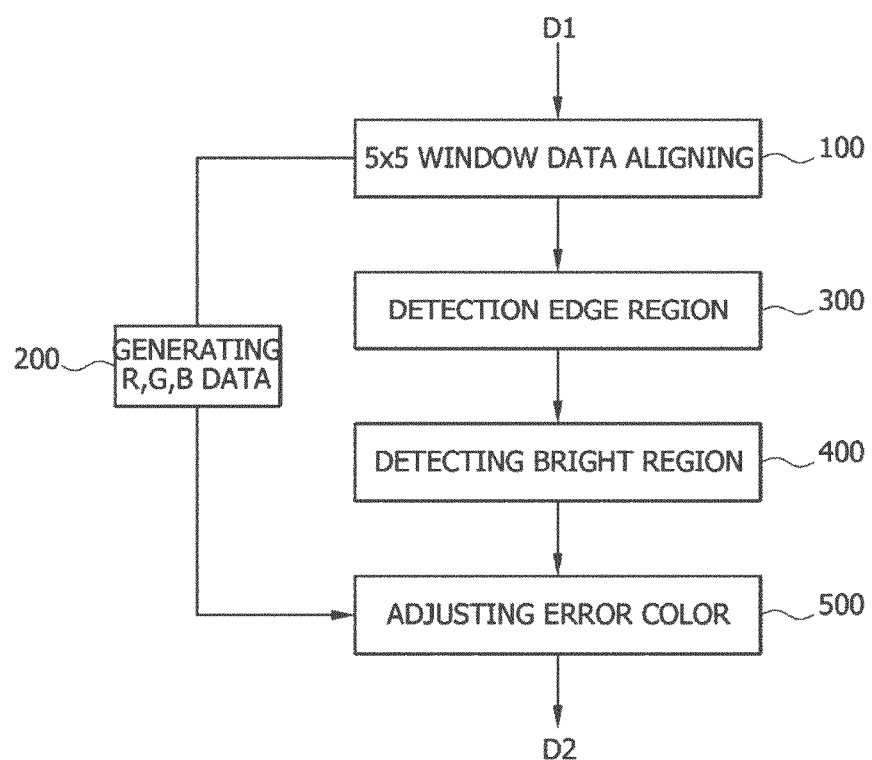
FIG. 7 illustrates an image signal processing method of an image sensing device in accordance with an embodiment of the invention.

FIG. 7 illustrates an image signal processing method of an image sensing device in accordance with an embodiment of the invention.

A data window is generated using Bayer data D1 (100). A R, G, B data of a center pixel in the data window is generated (200). Whether there is an edge region is determined (300). Whether there is a bright region is determined (400). The detecting process and generating the R, G, B data may be performed in parallel. If there is a bright region and an edge region, the color is adjusted (500).

If the adjusting error color step 500 is performed, the generated R, G, B data is not used and a new R, G, B data determined by the adjusting error color step 500 is outputted and is used for making an image. If the adjusting error color is not performed, the generated R, G, B data is used as an interpolated data.

As described above, if branches of a tree are taken on a fine day, a boundary region around the branches in an image may have error color information caused by an interpolating process. To remove the error color information, an image sensing device needs additional circuits.

Since an image sensing device in accordance with an embodiment of the invention can suppress error color through adjusting error color during an interpolating process, the image sensing device does not need additional circuits or additional processes and may be able to more accurately render an image using the original data processing circuits. That is, as a result of the adjusting error color implemented with a Bayer data during an interpolating process, the image sensing device provides a R, G, B data suppresses error color information. Finally, an image sensing device in accordance with an embodiment of the invention can provide a good quality of image.

While the present invention has been described with respect to the specific embodiments, it will be apparent to those skilled in the art that various changes and modifications may be made without departing from the spirit and scope of the invention as defined in the following claims.

What is claimed is:

1. An image data processing method, comprising:
generating data window comprising N row and N columns using a Bayer data from a pixel array;
generating a red (R), green (G), blue (B) data of a center pixel in the data window;
detecting an edge region in the data window;
detecting a bright region in the data window;
adjusting the R, G, B data using a suppressing gain factor if both the edge region and the bright region is detected; and
outputting the adjusting R, G, B data as a result of an interpolating process.

2. The method of claim 1, wherein the step of generating an R, G, B data of a center pixel includes calculating average of pixels neighboring the center pixel.

3. The method of claim 1, wherein the step of detecting an edge region in the data window includes that if a difference between two contiguous pixels in the data window is higher than a predetermined threshold value, an edge direction is determined toward the two contiguous pixels.

4. The method of claim 1, wherein the step of detecting the bright region in the data window includes that if average of two continuous pixels including at least one green pixel in the data window is higher than a predetermined threshold value, the data window includes a bright region.

5. The method of claim 4, wherein the two continuous pixels are arranged in a horizontal direction.

6. The method of claim 4, wherein the two continuous pixels are arranged in a perpendicular direction.

7. The method of claim 1, wherein adjusting the R, G, B data using a suppressing gain factor includes:
calculating a first difference between green color data and red color data of the center data, and a second difference between green color data and blue color data of the center data;
generating a new R data by a formula 4; and
generating a new B data by a formula 5
where formula 4 is New Red=Green±(Diff_gr*Gain_sup), and where formula 5 is New Blue=Green±(Diff_gb*Gain_sup)

where Diff_gr is a first difference, Diff_gb is a second difference, and Gain_sup is a suppressing gain factor.

8. The method of claim 1, wherein the step of detecting the edge region and the bright region and the step of generating the R, G, B data are performed in parallel.

9. The image sensor of claim 1, wherein the data window comprises one of 3 rows and 3 columns, 5 rows and 5 columns, and 7 rows and 7 columns.

10. An image sensing device, comprising:
an red (R) green (G) blue (B) data generating unit extracting a R, G, B data for a center pixel from a data window comprising N rows and N columns arranged as a Bayer pattern;
an edge detecting unit detecting an edge region of the data window;
a bright region detecting unit detecting an bright region of the data window;
an error color reducing unit adjusting the R, G, B data using the edge region and the bright region; and
an outputting unit outputting the extracted R, G, B data for the RGB data generating unit or the adjusted R, G, B data from the error color reducing unit.

11. The image sensing device of the claim 10, wherein the RGB data generating unit generates RGB data using a Bayer pattern.

12. The image sensing device of the claim 10, wherein the edge detecting unit determines that an edge direction is arranged toward two continuous pixels if a difference between the two continuous pixels in the data window is higher than a predetermined threshold value.

13. The image sensing device of the claim 10, wherein the bright region detecting unit determines that the data window includes a bright region if an average of two continuous pixels including at least one green pixel in the data window is higher than a predetermined threshold value.

14. The image sensing device of the claim 13, wherein the two continuous pixels are arranged in a horizontal direction.

15. The image sensing device of the claim 13, wherein the two continuous pixels are arranged in a horizontal direction.

16. The image sensing device of the claim 10, wherein the error color reducing unit
calculates a first difference between green color data and red color data of the center data, and a second difference between green color data and blue color data of the center data,
generates a new R data by a formula 6 and generates a new B data by a formula 7
where formula 6 is New Red=Green±(Diff_gr*Gain_sup), and where formula 7 is New Blue=Green±(Diff_gb*Gain_sup)

where Diff_gr is a first difference, Diff_gb is a second difference, and Gain_sup is a suppressing gain factor.

17. The image sensing device of the claim 10, wherein the detecting operation of the edge region or the bright region, and the generating operation of the R, G, B data are performed in parallel.

18. The image sensing device of the claim 10, wherein the data window comprises one of 3 rows and 3 columns, 5 rows and 5 columns, and 7 rows and 7 columns of data.

19. An image sensing device configured to detect an edge region and a bright region in a data window in a Bayer data format comprising a pixel array; and
adjusting a red (R), green (G) and blue data associated with pixels comprising the pixel array where the adjusting is done using a suppressing gain factor if both an edge region and a bright region is detected within the data window.

20. The image sensing device of claim 19 wherein the image sensing device is configured to:
determine an edge direction based on a difference between two contiguous pixels in the data window;
determine the bright region based on whether an average of data associated with two contiguous pixels including at least one green pixel in the data window is greater than a predetermined threshold value.

* * * * *